Jan. 5, 1971 E. C. LLOYD 3,553,710
ERASABLE TRACE RECORDER
Filed March 14, 1969

INVENTOR
Edward C. Lloyd

United States Patent Office 3,553,710
Patented Jan. 5, 1971

3,553,710
ERASABLE TRACE RECORDER
Edward C. Lloyd, Potomac, Md.
(446 Santa Cecelia St., Solana Beach, Calif. 92075)
Filed Mar. 14, 1969, Ser. No. 807,179
Int. Cl. G01d 9/02
U.S. Cl. 346—21                     4 Claims

ABSTRACT OF THE DISCLOSURE

A source of ultraviolet radiation illuminates the stylus-drawn ink trace on the recording surface of a chart-type recorder. The ink is compounded of a dye that is faded to extinction by the ultraviolet radiation, thereby automatically expunging the trace. Alternatively, the ink may be compounded of a dye that is faded to a modified appearance by the ultraviolet radiation, thereby providing identification of older parts of the trace from newer parts, and an extended trace.

BACKGROUND OF THE INVENTION

The invention described herein may be manufactured and used by or for the Government of the United States of America for governmental purposes without payment of any royalties thereon or therefor.

This invention relates to recorders or recording devices in which the record consists of a visible trace made by a stylus on a continuously moving paper chart or other recording surface, particularly closed-chart recorders wherein the recording surface may repeatedly pass under the stylus. An example is the circular-chart recorder widely used industrially to provide a continuous record of temperature, pressure, or other variable, over periods of hours or days, the record being made on a disk-shaped chart. Another example is the well-known drum-type recorder used to record barometric pressure on a cylindrical paper chart mounted on a rotating drum.

In recorders of these types it is usually necessary to change the chart periodically, and this often involves considerable expense and inconvenience. Further, in instances where comparison of the records for a series of successive time periods is desired, this must usually be done rather laboriously by comparison of the individual charts accumulated over the periods of time of interest.

This invention provides a recorder in which the necessity for periodic changing of charts is eliminated, in either of two modes of operation: by automatically expunging the trace within the first chart revolution after the trace is formed so that the stylus is continuously presented with an unmarked recording surface, permitting a single chart to be used indefinitely; or, by automatically and progressively changing the appearance of the portions of the trace formed during successive revolutions of the chart, thus extending the length of the useful record that can be made on a single chart, and permitting easy comparison of corresponding portions of the record over a number of successive periods or revolutions of the chart.

In the present invention, a chart is rotated and a stylus is positioned to record a trace on the chart in ink received from a reservoir. The ink contains a dye that is faded by exposure to ultraviolet radiation. A source of ultraviolet radiation is located in a stationary position so as to illuminate a portion of the chart area with predetermined intensity. As the chart revolves, successive areas of the chart pass into the illuminated region, and the total increment of ultraviolet radiation falling on any unit area of the chart during each revolution is thus determined by the average intensity of ultraviolet illumination of that area and the time, was determined by the speed of rotation and the dimensions of the above-mentioned illuminated portion of the chart, of exposure to this average intensity. The illuminated portion of the chart may be a small fraction of the total chart area, or it may be substantially the entire chart area. In the latter case, the trace will be continuously faded from the time that it is formed and it will exhibit a continuously graduated fading over its entire length. If an ink is used containing dye that is faded completely by one such increment of radiation, the trace will become substantially invisible after one revolution of the chart. If, on the other hand, the dye is of a type that is not completely faded by one such increment of radiation, the parts of the trace formed during successive revolutions will be progressively changed in color or appearance as the chart revolves and if, with such a dye, the illuminated portion of the chart is a small fraction of the total chart area each portion of the trace will be faded a discrete amount during each pass under the ultraviolet source, and the trace will exhibit a succession of discrete changes, or steps, in color or appearance.

DESCRIPTION OF THE PREFERRED EMBODIMENT

Figure 1:
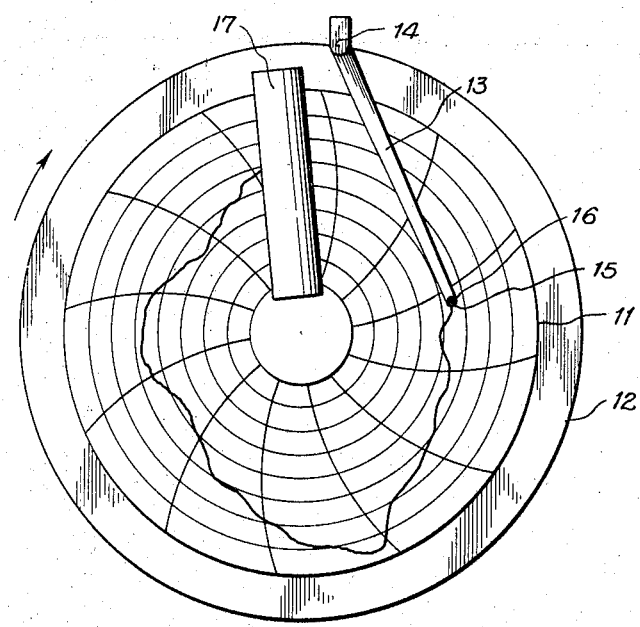
FIG. 1 is a full front view of an embodiment of the present invention.
Figure 2:
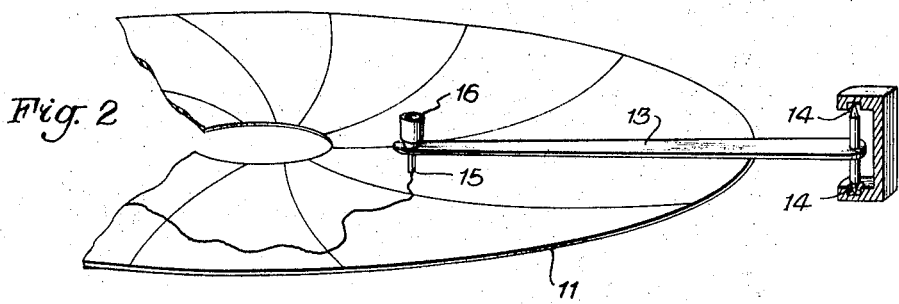
FIG. 2 is a detailed drawing of an arm, arm support, pivots, stylus, ink reservoir, and chart, used in the embodiment in FIG. 1.

In FIGS. 1 and 2 paper chart 11 is mounted on a disk 12 that is revolved continuously in a clockwise direction about its center by conventional means that is not illustrated. Arm 13 is carried on pivots 14, and supports stylus 15 which forms an ink trace on chart 11 as the chart and disk 12 revolve. Reservoir 16, also carried by arm 13, contains ink, which is compounded with a dye that is faded by ultraviolet radiation, and supplies the ink to the stylus through a connecting passage. Ultraviolet source 17 is located so as to illuminate a portion of the chart, and the portion of the trace thereon, as the chart revolves, with an intensity of ultraviolet radiation sufficient to fade the trace to a desired degree, as explained elsewhere herein, during a revolution of the chart.

FIG. 2 is a perspective view of arm 13 carried by pivots 14 and supporting stylus 15 and ink reservoir 16. The stylus 15 bears on chart 11 so as to form a trace at a variable distance from the center of the chart, dependent upon the position of arm 13, as the chart revolves.

Figure 3:
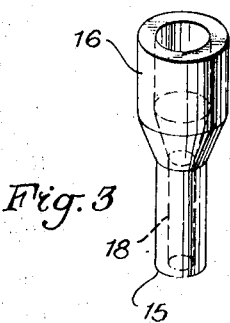
FIG. 3 is a view illustrating the stylus, ink reservoir, and connecting passage, used in the embodiment in FIG. 1.

FIG. 3 illustrates a construction in which stylus 15 is connected to ink reservoir 16 by passage 18. Ink placed in reservoir 16 is conducted by capillary action or by action of gravity to stylus 15 and thence to the surface of chart 11.

Figure 4:
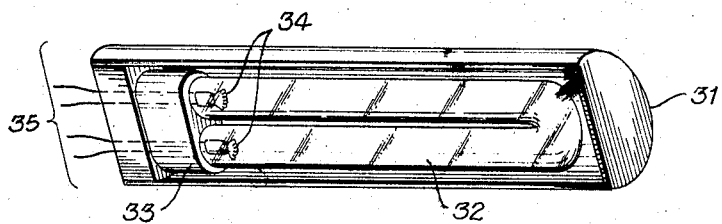
FIG. 4 is a detailed drawing of an ultraviolet radiation source used in the embodiment in FIG. 1.

FIG. 4 is a perspective view illustrating one form of ultraviolet source, comprising a reflector 31, a sealed U-shaped glass tube 32, containing mercury vapor, mounted on base 33, and also containing electrodes 34 connected to an electric power source, not shown, via wire leads 35. When electric current from a suitable electric power source is supplied to electrodes 34 via leads 35, an electric discharge through the mercury vapor occurs which gives rise to the ultraviolet radiation required to cause the fading action heretofore described. Reflector 31, which may be a semicylindrical sheet-metal partial enclosure, serves to direct the ultraviolet radiation onto the chart surface or a selected portion thereof.

In operation, a conventional recorder mechanism, not illustrated, moves stylus 15 in a direction substantially parallel to a radius of disk 12, thus tracing a variable record in ink on chart 11 as it revolves with disk 12. The region of the chart in proximity to source 17 is illuminated by the ultraviolet radiation, of selected intensity, which results in a predetermined total amount of radiation falling on each unit area of the chart as each such area moves past source 17. If the dye in the ink fades sufficiently when exposed once to such predetermined amount of radiation the trace becomes substantially invisible as it passes once under source 17. If the dye in the ink fades incompletely on one such exposure, the trace will be faded an incremental amount each time it passes under the source, so that the portions of the trace made during successive revolutions of the chart will each have a different faded appearance.

In one arrangement, using a recorder in which the chart makes one revolution in 7 days, the ultraviolet source may comprise a 4-watt mercury vapor lamp having its major radiation at 253.7 millimicrons, arranged to illuminate a narrow strip of the chart normal to the direction of chart motion, and the ink may contain a dye known in the trade as Niagara Blue G or Calcocid Scarlet M00 Concentrate. A trace made by ink containing the former dye fades nearly completely in an exposure of a few hours, when it is within one or two inches of the 4-watt mercury vapor lamp, thus substantially removing the trace in a single pass under the source, occurring in a single revolution of the chart. A trace made by ink containing the latter dye fades more gradually under the conditions of illumination described, requiring several passes under the source in order to be obliterated, resulting in the trace exhibiting a succession of step changes in color. These step change in color serve to identify the record made on successive revolutions of the chart, permitting an intelligible record of many revolutions to be accumulated on one chart.

It will be understood, of course, that the foregoing disclosure relates to only a preferred embodiment of the invention and that numerous modifications may be made therein without departing from the scope of the invention as set forth in the appended claims. For example, various dyes may be used, with appropriate amounts of ultraviolet illumination. Further, any type of chart recorder could be used in place of the circular chart or drum chart recorders disclosed.

I claim:
1. In a recording device,
   a recording surface,
   an ink-marking stylus positioned to produce a trace on said surface,
   means for causing relative motion between said stylus and said recording surface,
   an ink reservoir connected to said stylus,
   ink in said reservoir and in said stylus containing a dye that is faded when exposed to ultraviolet radiation and,
   a source of ultraviolet radiation positioned to illuminate said recording surface.
2. The recording device set forth in claim 1 wherein:
   said source of ultraviolet radiation illuminates a predetermined fractional area of said surface for predetermined time intervals,
   said predetermined fractional area being less than the entire area of said surface, and wherein:
   the intensity of illumination provided by said source of ultraviolet radiation, and the fading characteristic of said dye, are such that the dye in said trace is faded to extinction in one of said time intervals.
3. The recording device set forth in claim 1 wherein:
   said source of ultraviolet radiation illuminates a predetermined fractional area of said surface for predetermined time intervals,
   said predetermined fractional area being less than the entire area of said surface, and wherein:
   the intensity of illumination provided by said source of ultraviolet radiation, and the fading characteristic of said dye, are such that the said dye is faded an incremental amount during each of said time intervals, whereby the portions of the trace made during each of said time intervals has a different faded appearance.
4. The recording device set forth in claim 1 wherein:
   the recording surface is a closed surface that moves repetitively with respect to said stylus,
   said source of ultraviolet radiation illuminates substantially the entire area of said recording surface, and wherein:
   the intensity of illumination provided by said source of ultraviolet radiation, and the fading characteristic of said dye, are such that the degree of fading increases continuously along the visible length of the trace as it is formed during each repetitive motion of said surface.

References Cited

UNITED STATES PATENTS

| | | | |
|---|---|---|---|
| 3,011,854 | 12/1961 | Allen | 346—21 |
| 3,491,364 | 1/1970 | McEwan et al. | 346—21 |

JOSEPH W. HARTARY, Primary Examiner

U.S. Cl. X.R.

106—22; 346—123, 140